US010436328B2

United States Patent
Rouillon

(10) Patent No.: US 10,436,328 B2
(45) Date of Patent: Oct. 8, 2019

(54) DRY GAS SEAL WITH ELECTRONICALLY CONTROLLED SHUTDOWN VALVE

(71) Applicant: John Crane UK Ltd., Berkshire (GB)

(72) Inventor: Raphael Rouillon, Berkshire (GB)

(73) Assignee: JOHN CRANE UK LTD., Slough, Berkshire (GB)

( * ) Notice: Subject to any disclaimer, the term of this patent is extended or adjusted under 35 U.S.C. 154(b) by 0 days.

(21) Appl. No.: 15/618,531

(22) Filed: Jun. 9, 2017

(65) Prior Publication Data

US 2017/0356550 A1 Dec. 14, 2017

Related U.S. Application Data

(60) Provisional application No. 62/348,565, filed on Jun. 10, 2016.

(51) Int. Cl.
| | | |
|---|---|---|
| *F16J 15/40* | (2006.01) | |
| *F16J 15/34* | (2006.01) | |
| *F16K 31/06* | (2006.01) | |

(52) U.S. Cl.
CPC .......... *F16J 15/40* (2013.01); *F16J 15/3484* (2013.01); *F16K 31/06* (2013.01)

(58) Field of Classification Search
CPC ......... F16J 15/40; F16J 15/3484; F16K 31/06
See application file for complete search history.

(56) References Cited

U.S. PATENT DOCUMENTS

| | | |
|---|---|---|
| 2,128,744 A | 8/1938 | Hornschuch |
| 2,531,079 A | 11/1950 | Payne |
| 2,984,507 A | 5/1961 | Welch |
| 3,589,738 A | 6/1971 | Tracy |
| 3,632,117 A | 1/1972 | Villasor |
| 3,751,045 A | 8/1973 | Lindeboom |
| 3,994,503 A | 11/1976 | Dousse et al. |
| 4,183,540 A | 1/1980 | Hytonen |
| 4,212,475 A | 7/1980 | Sedy |

(Continued)

FOREIGN PATENT DOCUMENTS

| | | |
|---|---|---|
| DE | 3843288 A1 | 6/1990 |
| EP | 0499370 A1 | 8/1992 |

(Continued)

OTHER PUBLICATIONS

Search Report and Written Opinion dated Aug. 29, 2017 for PCT Application No. PCT/US2017/036807, 12 pages.

(Continued)

*Primary Examiner* — Gilbert Y Lee
(74) *Attorney, Agent, or Firm* — Cantor Colburn LLP

(57) ABSTRACT

A mechanical seal system configured to inhibit the emission of process gas from a rotating machine. An annular plunger is axially slidable between a inboard closed position and an outboard open position such that when the plunger is in the closed position, the plunger inhibits the flow of the sealing fluid between the inlet passageway to the seal interface, and when the plunger is in the closed position, the plunger enables the flow of the sealing fluid between the inlet passageway and the seal interface. A biasing mechanism and solenoid provide opening and closing forces to the plunger. Normally-open and normally-closed configurations are provided.

18 Claims, 12 Drawing Sheets

(56) References Cited

U.S. PATENT DOCUMENTS

| | | |
|---|---|---|
| 4,395,048 A | 7/1983 | Timmermans et al. |
| 4,406,466 A | 9/1983 | Geary, Jr. |
| 4,447,063 A | 5/1984 | Kotzur et al. |
| 4,768,790 A | 9/1988 | Netzel et al. |
| 4,993,917 A | 2/1991 | Kulle et al. |
| 5,039,113 A | 8/1991 | Gardner |
| 5,058,905 A | 10/1991 | Nosowicz et al. |
| 5,066,026 A | 11/1991 | Heck et al. |
| 5,137,284 A | 8/1992 | Holder |
| 5,141,389 A | 8/1992 | Bear et al. |
| 5,158,431 A | 10/1992 | Schellong et al. |
| 5,180,173 A | 1/1993 | Kimura et al. |
| 5,224,714 A | 7/1993 | Kimura et al. |
| 5,275,421 A | 1/1994 | Hornsby |
| 5,421,593 A | 6/1995 | Aritsubo et al. |
| 5,443,274 A | 8/1995 | Fuse |
| 5,496,047 A | 3/1996 | Goldswain et al. |
| 5,664,789 A | 9/1997 | Hayashi |
| 5,700,013 A | 12/1997 | Baty |
| 5,823,539 A | 10/1998 | Rockwood |
| 5,899,460 A | 5/1999 | Altieri |
| 6,142,478 A | 11/2000 | Pecht et al. |
| 6,347,800 B1 | 2/2002 | Auber |
| 6,425,583 B1 | 7/2002 | Muraki |
| 6,431,551 B1 | 8/2002 | Fuse et al. |
| 6,494,458 B2 | 12/2002 | Uth |
| 6,517,077 B1 | 2/2003 | Enomura |
| 6,524,059 B1 | 2/2003 | Nogiwa |
| 6,565,095 B2 | 5/2003 | Meacham |
| 6,655,693 B2 | 12/2003 | Hosanna et al. |
| 6,746,019 B1 | 6/2004 | Lienbenberg et al. |
| 6,905,123 B2 | 6/2005 | Goldswain |
| 8,651,801 B2 | 2/2014 | Shamseldin et al. |
| 10,132,412 B2 | 11/2018 | Matheidas et al. |
| 2003/0015842 A1 | 1/2003 | Wilhelm |
| 2005/0002414 A1 | 1/2005 | Miyaoka |
| 2008/0042364 A1 | 2/2008 | Zheng et al. |
| 2009/0290971 A1 | 11/2009 | Shamseldin et al. |
| 2010/0072706 A1* | 3/2010 | Schmitz ............... F16J 15/3436 277/301 |
| 2010/0150715 A1* | 6/2010 | Howard ................ F16J 15/164 415/230 |
| 2017/0045144 A1 | 2/2017 | Khaira et al. |
| 2018/0038488 A1 | 2/2018 | Matheidas et al. |

FOREIGN PATENT DOCUMENTS

| | | |
|---|---|---|
| EP | 0578377 A1 | 1/1994 |
| EP | 1 918 618 B1 | 1/2011 |
| FR | 2563583 A1 | 10/1985 |
| GB | 1309865 | 3/1973 |
| GB | 1497257 | 1/1978 |
| GB | 2167141 A | 5/1986 |
| WO | WO 99/27281 A1 | 6/1992 |
| WO | WO 96/15397 A1 | 5/1996 |
| WO | WO 00/75540 A1 | 12/2000 |

OTHER PUBLICATIONS

Communication dated Dec. 22, 2003 for EP Application No. 03075287.7, 3 pages.

* cited by examiner

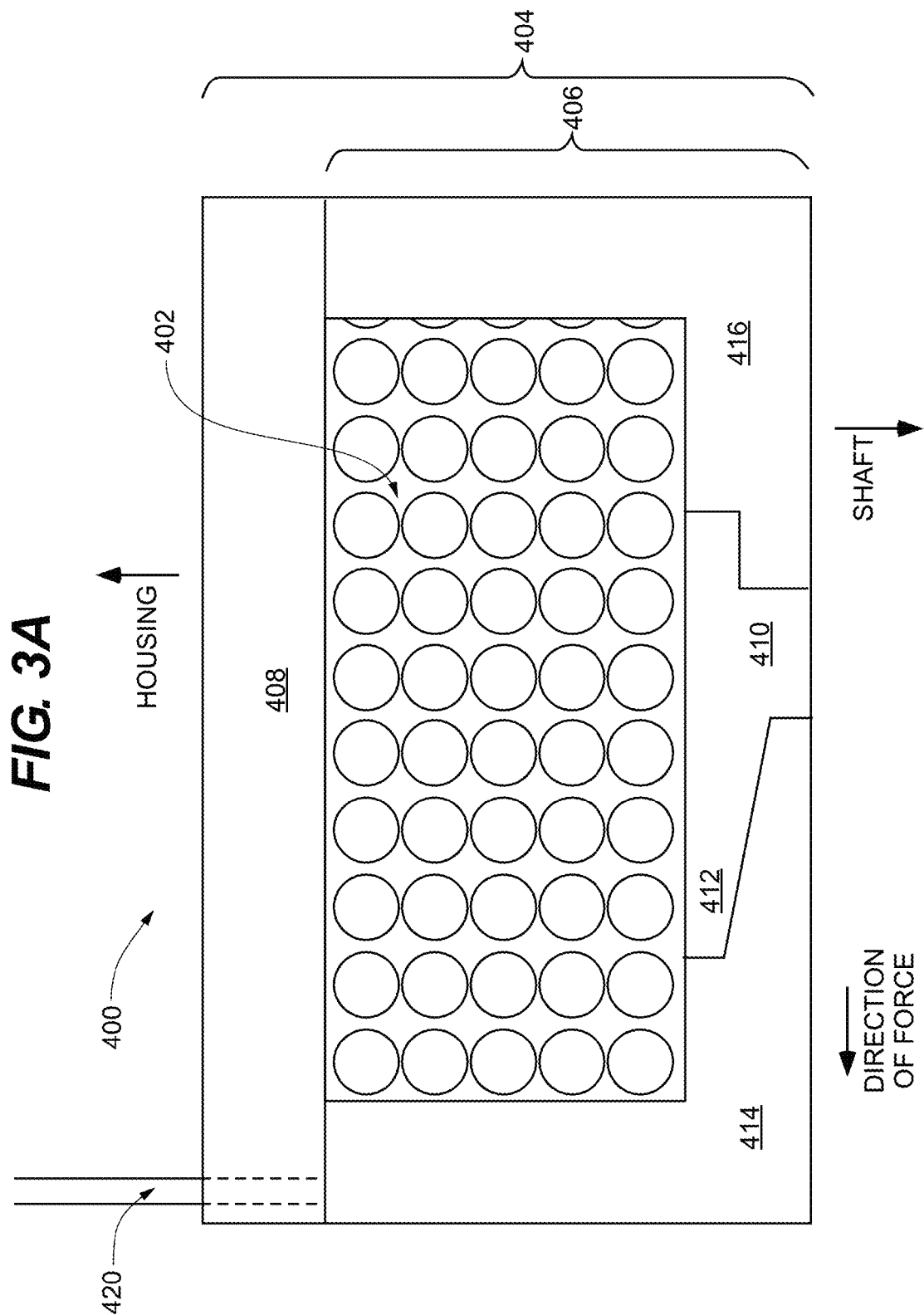

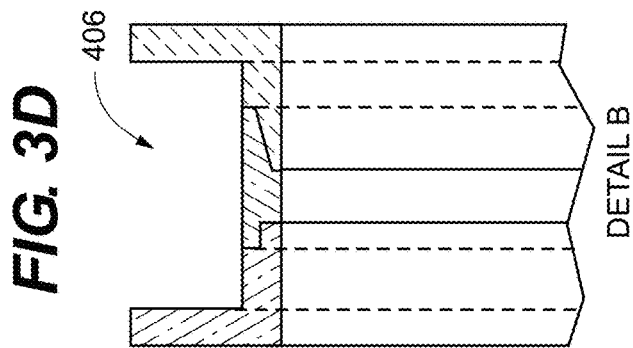
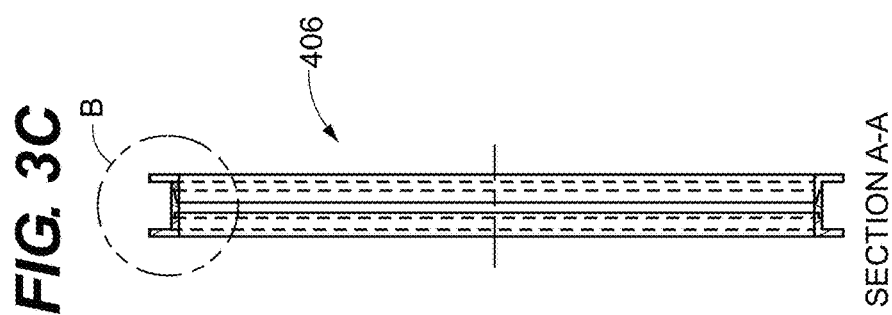
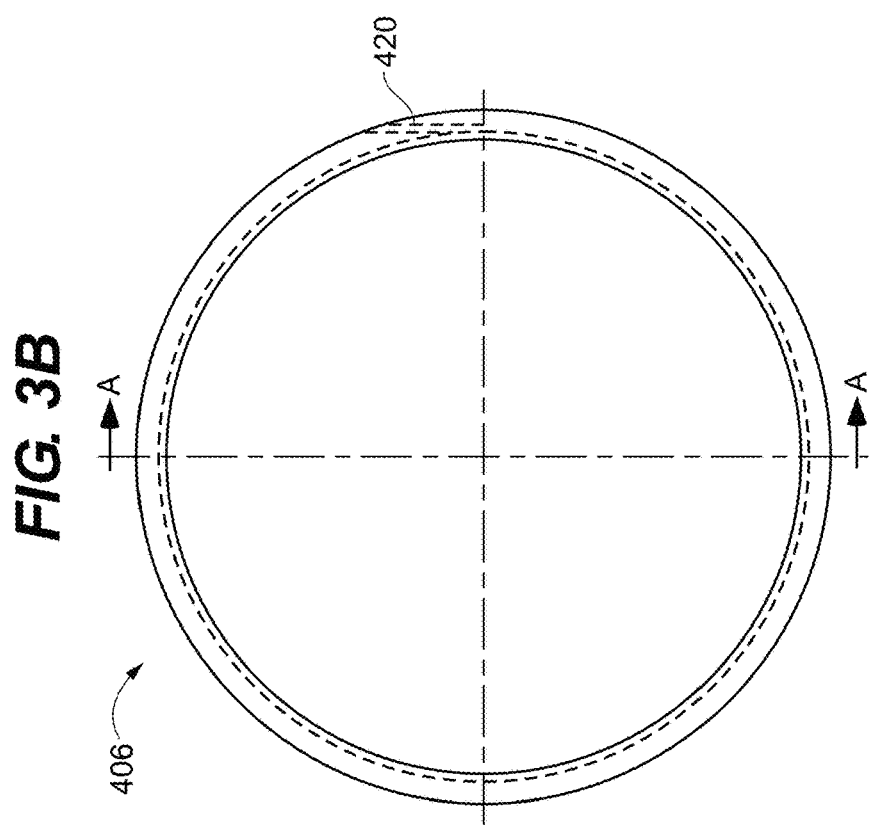

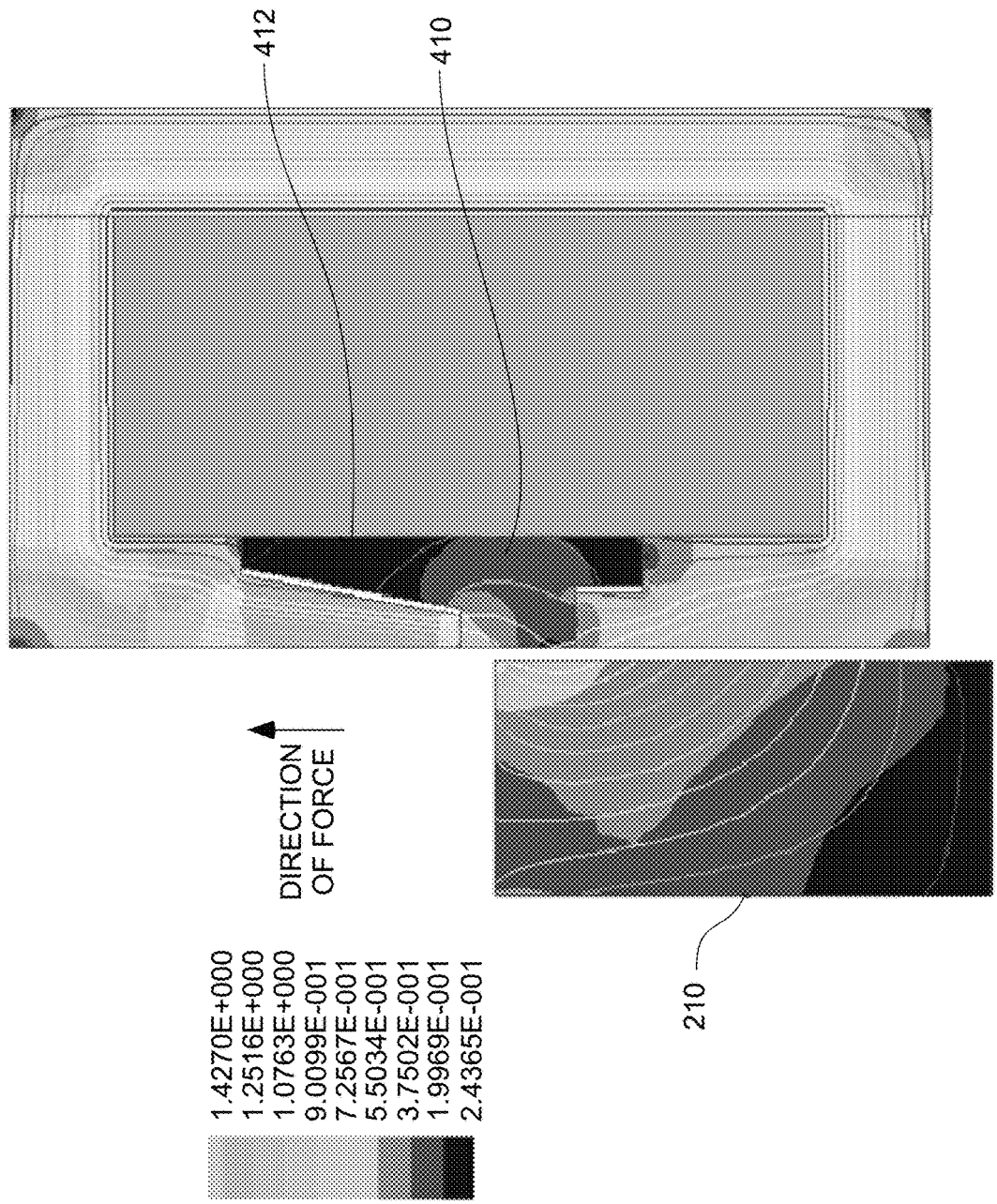

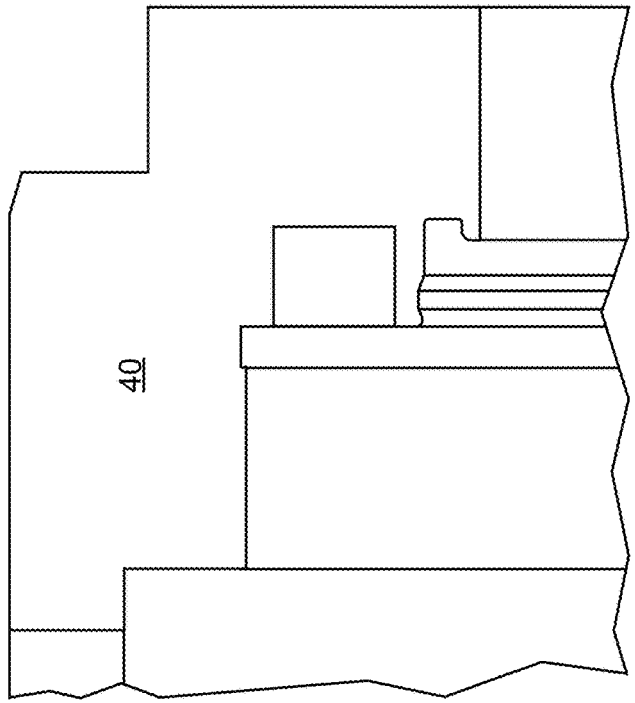
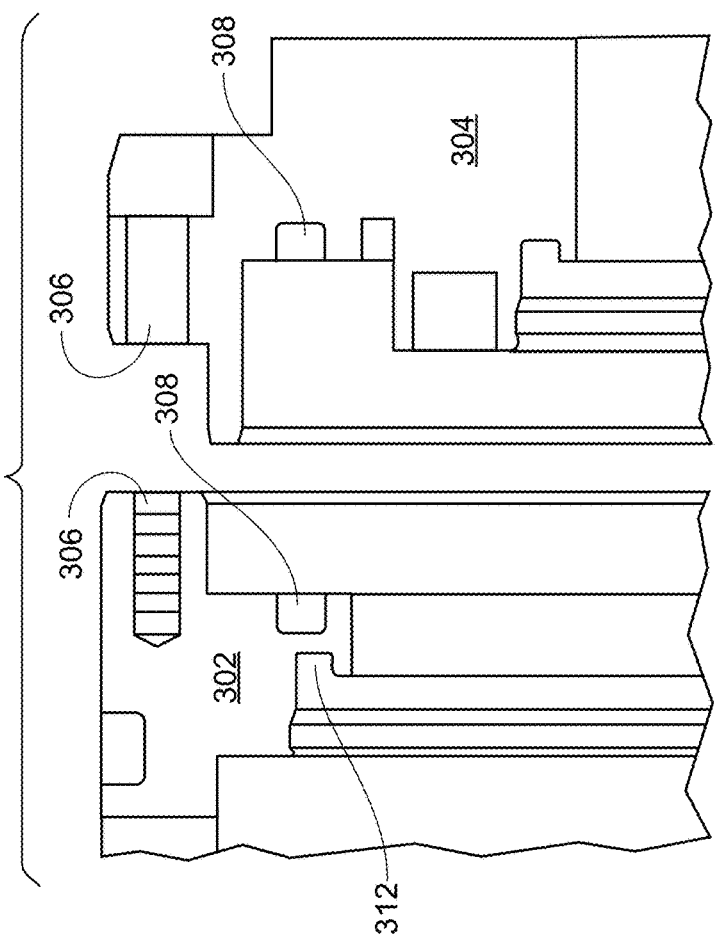

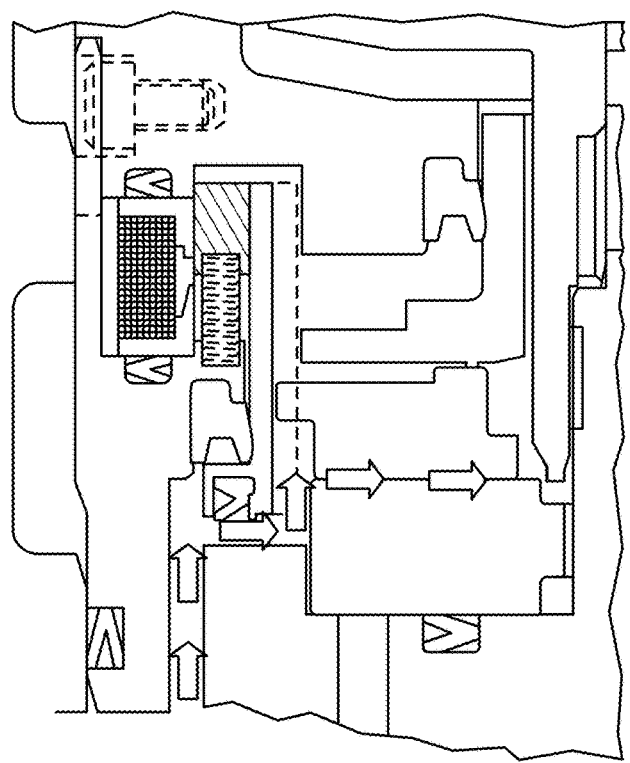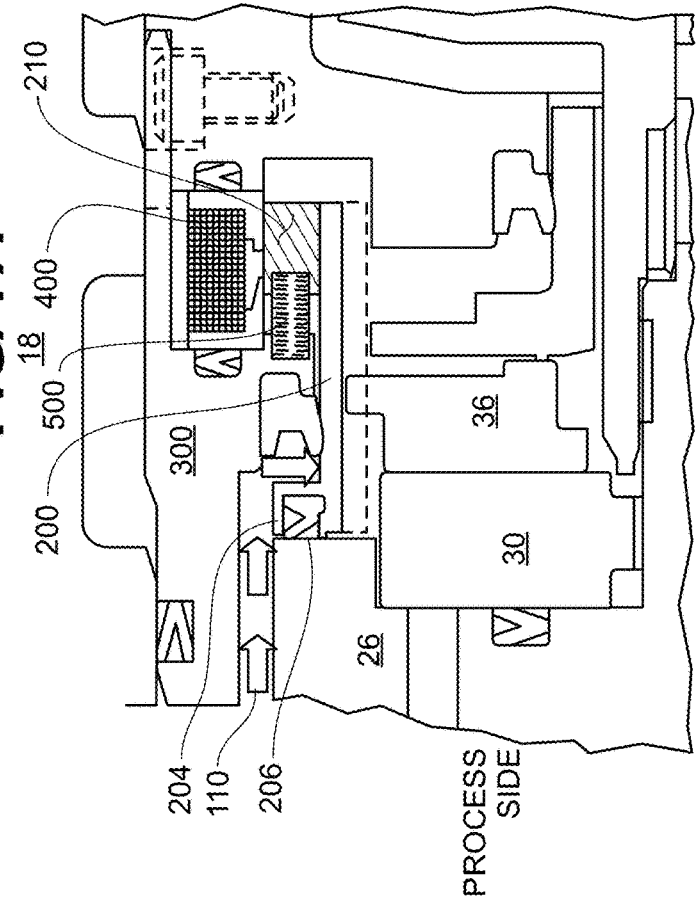

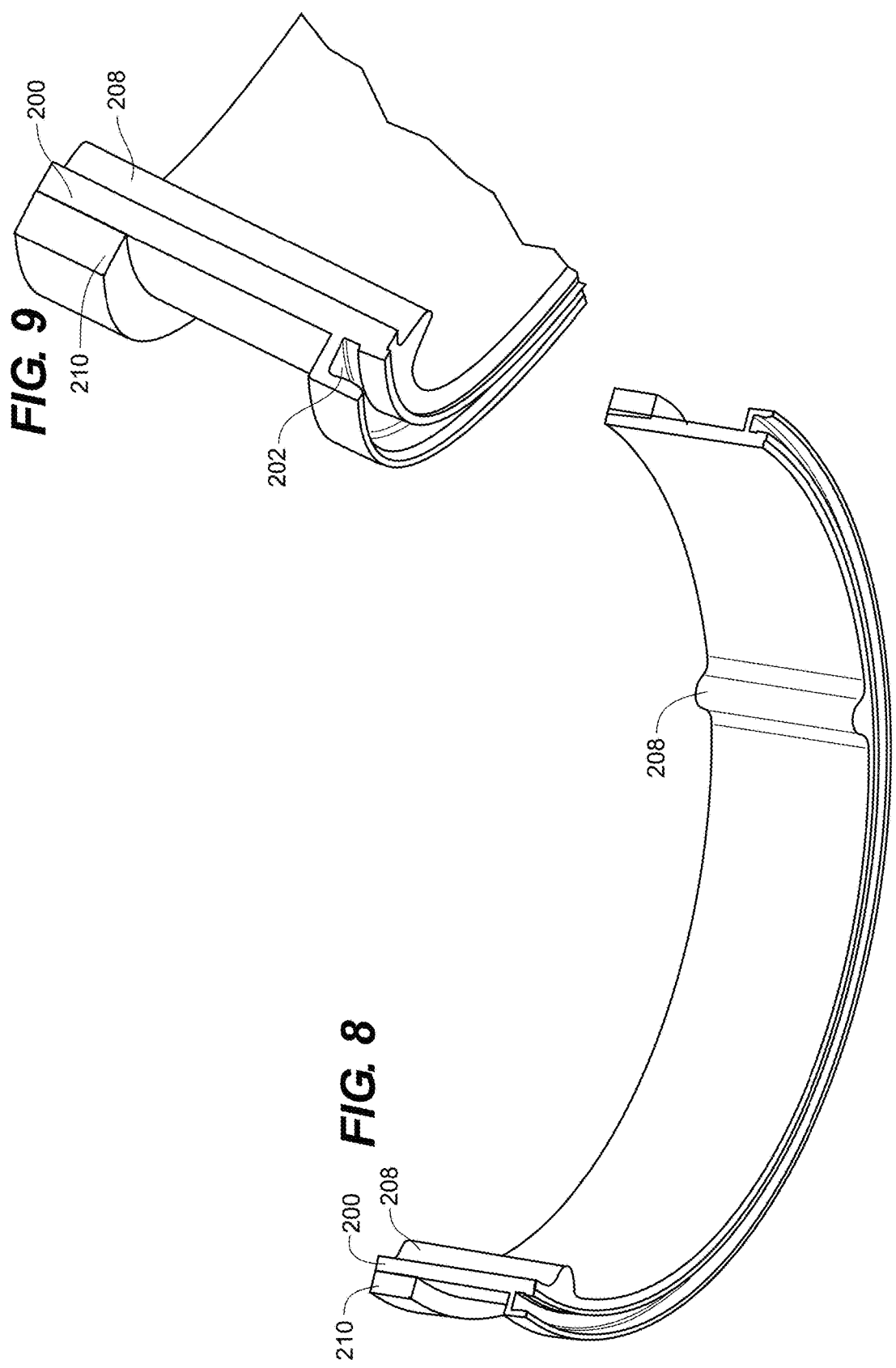

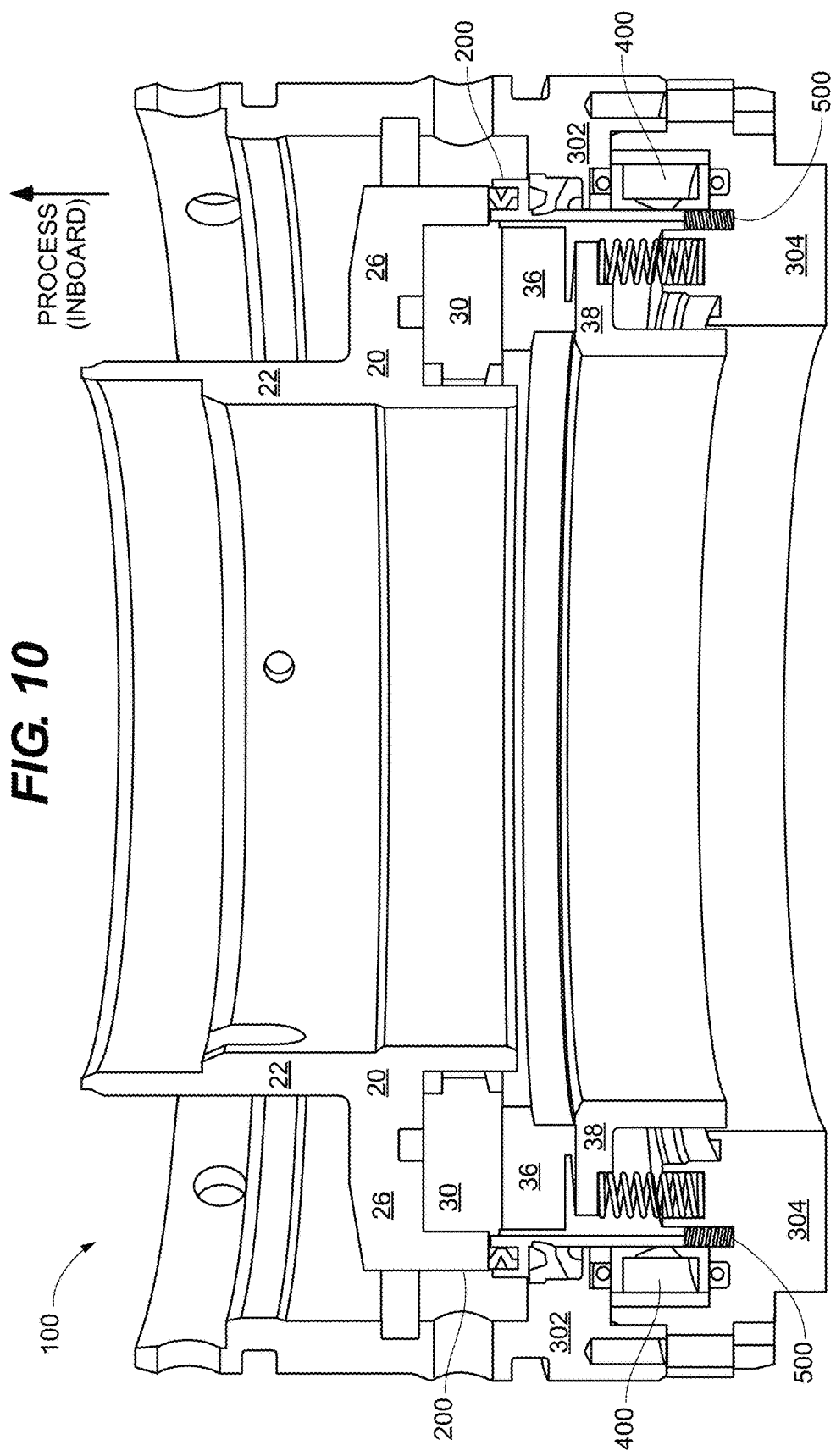

DRY GAS SEAL WITH ELECTRONICALLY CONTROLLED SHUTDOWN VALVE

RELATED APPLICATION

This application claims the benefit of U.S. Provisional Application No. 62/348,565 filed Jun. 10, 2016, the contents of which are incorporated by reference herein.

TECHNICAL FIELD

The present disclosure relates to mechanical seals, and more particularly to non-contacting gas-lubricated dry seals including an axially slidable annular sealing plunger configured to eliminate or reduce leakage from a compressor when the compressor is in standby mode.

BACKGROUND

Gas lubricated mechanical face seals, such as those described in U.S. Pat. Nos. 5,496,047 and 8,651,801 (the disclosures of which are incorporated by reference herein) rely on a cushion of seal gas built up between the sealing faces in order to provide lubrication, and thereby inhibit contact between the faces. In many applications, this lubricating gas is the process or product gas that is being compressed or processed by the mechanical energy transmitted by the rotating shaft.

One application of gas lubricated mechanical face seals (also known as "dry seals" or "dry gas seals") is to provide a seal between a process chamber of a compressor and the outside environment. For example, in the petrochemical industry, centrifugal compressors may be located at intervals along a natural gas pipeline to boost the gas pressure for processing, to counter the effect of flow losses along the transmission pipelines and to generally keep the gas moving towards its destination. These compressors can be used upstream (during exploration and production), midstream (during processing, storage and transportation), or downstream (during natural gas/and petrochemical refining, transmission and distribution) in a petrochemical process. These centrifugal compressors can also be used to transport other fluids.

To move natural gas or other fluids, centrifugal compressors use a rotating disk or impeller in a shaped housing to force the gas to the rim of the impeller, thereby increasing the velocity of the gas. A diffuser (divergent duct) converts the velocity energy to pressure energy.

Dry gas seals may be used to reduce frictional wear on the rotating components while preventing leakage of the centrifuged or processed gas. To further inhibit leakage of processed gas into the atmosphere, some centrifugal compressors can include a pair of dry gas seals working in tandem.

When used in high-pressure applications, the seal gas (also known as "lubricating gas") or other can leak in static (or "standby") conditions where the seal faces are not spinning relative to each other.

FIG. 1 depicts a cross-sectional view of a typical arrangement of a tandem dry seal assembly 10 as known in the art. As is common for seals of this type, seal assembly 10 can seal the shaft 12 of a rotating machine such that seal assembly 10 provides a seal between the process chamber 14 and a shaft bearing cavity 16. The seal assembly 10 can be mounted in a generally cylindrical bore (or "seal chamber") defined by the process chamber at an axially inboard end and the bearing chamber at an axially outboard end, and extending radially outward to a housing 18.

Seal assembly 10 comprises rotating components operably coupled to shaft 12 and stationary components operably coupled to housing 18.

Annular sleeve 20 comprises an axially extending shaft portion 22 which can be operably coupled to the shaft 12 for rotation therewith. Sleeve 20 can comprise a flange portion 26 extending radially outwardly at the inboard end of the seal assembly 10, for arrangement proximal process chamber 14. As depicted in FIG. 1, shaft portion 22 extends axially outboard of flange portion 26, however as depicted in FIG. 11, shaft portion 22 can extend axially inboard of flange portion 26 in various seal assemblies.

An annular rotating seal ring (or "mating ring") 30 is mounted adjacent the outboard face of flange formation 26. An axially fixed annular member 34 can be mounted on the external diameter of shaft portion 22, abutting rotating seal ring 30, thereby inhibiting axial movement of rotating seal ring 30 outboard from flange portion 26.

A annular stationary seal ring (or "primary ring") 36 is mounted on an annular carrier 38 which is slidably located between annular member 34 and an annular retainer 40 which is secured to housing 18. In the depicted seal, a plurality of radially spaced compression springs 46 act as carrier biasing members between retainer 40 and carrier ring 38, to urge the second stationary seal ring 36 towards the rotating seal ring 30. In other seals known in the art, other carrier biasing mechanisms, such as bellows, are used.

A seal interface 54 is defined by an outboard facing rotating seal face 50 of rotating seal ring 30 and an inboard facing stationary seal face 52 of stationary seal ring 36. Rotating seal face 50 can comprise a grooved area, such that the rotation of shaft 12 will cause seal gas to be pumped between the faces 50 and 52 of seal rings 30 and 36, to generate a load which opposes that applied by the springs 46, creating a fluid cushion to lubricate the sealing faces and provide a seal.

Seal assembly 10 can also include a second stage seal, including a third and fourth seal face member, which are not described here. Further stage seals and seal face members can also be provided.

If seal gas leaks into the seal at high-pressure, the drop in pressure can cause it to liquefy, which can be detrimental to the seal itself. Therefore, in many applications, large and expensive gas conditioning units are required in order to remove contaminants and return any fluids to a gaseous state before the gas is introduced to the seal. In addition, leaking gas must often be vented to the atmosphere, which may lead to undesired or unacceptable environmental consequences.

One approach to preventing leakage in standby conditions, as discussed in U.S. Pat. No. 6,905,123 (which is incorporated by reference herein), provides a stand-still seal in the form of a piston, forced by gas pressure into and out of sealing engagement with a sleeve member. This arrangement requires a source of gas under pressure, such as an accumulator. In addition, the seal chamber of the compressor must provide a passageway to allow pressurized gas into and out of the piston chamber. Such additional requirements are undesirable, because they add complication and expense to the mechanical seal system and compressor. In addition, many seals are installed into pre-existing compressor housings, which are not compatible to be retrofit to provide a passageway for piston gas.

An apparatus for inhibiting static leakage from a mechanical seal, without the need for an additional gas source to the seal, or other modification of the compressor housing would provide decided advantages.

SUMMARY

Embodiments of the present disclosure meet the need for an apparatus for inhibiting static leakage from a mechanical seal, without the need for an additional gas source to the seal or other modifications to the compressor housing. The present disclosure pertains to a dry gas seal with a shutdown valve which is electrically controlled such that the valve can be shut when the seal is standing still, such as, for example, when the seal is installed with a compressor that is pressurized but not running. Because the valve is directly controlled electromagnetically, no additional gas inlet is required. In addition, the disclosed valve mechanism can be incorporated into existing seal assemblies without the need for additional components inboard of the sleeve of the primary seal.

In embodiments, a mechanical seal assembly for coaxial arrangement around a rotatable shaft of a machine to inhibit the emission of a pressurized gas from within the machine the mechanical seal assembly comprises a mechanical seal including a rotating ring presenting a first annular seal face and a stationary ring presenting a second annular seal face oriented in opposed juxtaposition to the first annular seal face. The first and second annular seal faces are axially shiftable relative to each other at least in part by a flow of sealing fluid passing between the first and second annular seal faces. The mechanical seal assembly further includes an annular plunger at least partially surrounding the mechanical seal and that is axially slidable between an open position and a closed position.

In the open position, the inboard end of the plunger is axially spaced apart from a plunger seat, which permits the flow of sealing fluid to the mechanical seal through a passageway defined between the inboard end of the plunger and the plunger seat. In the closed position, the inboard end of the plunger abuts the plunger seat, so that the flow of the sealing fluid through the passageway to the mechanical seal is inhibited.

In embodiments, the mechanical seal assembly further comprises a plunger biasing mechanism that is configured to provide a biasing force to urge the plunger axially and an actuating mechanism that is configured to selectively provide an actuation force in opposition to the biasing mechanism to urge the plunger in a direction opposite the biasing force.

In embodiments, the actuating mechanism comprises an annular solenoid, and at least a portion of the plunger comprises a ferromagnetic material, such that the actuating force comprises a magnetic force produced by the solenoid. In embodiments, the solenoid can comprise an annular coil and a casing which has a ferromagnetic radially outward wall, a ferromagnetic axially inboard wall, a ferromagnetic axially outboard wall, and a partially ferromagnetic radially inward wall including a non-magnetic spacer.

In embodiments, a controller can be in electrical communication with the solenoid to selectively energize the solenoid. In embodiments, the controller can also be in communication with a rotational speed sensor and configured to energize the solenoid based on the rotational speed of the shaft.

In embodiments, the mechanical seal assembly can further comprise an annular retainer arranged radially outward of the mechanical seal and the plunger; wherein the retainer defines an annular solenoid groove and the solenoid is arranged within the solenoid groove of the retainer. In embodiments, the retainer can be made of a non-magnetic material.

In embodiments, the mechanical seal assembly can have a "normally-closed" configuration, in which the biasing mechanism is configured to urge the plunger axially inboard, such that the plunger is in the closed position when the actuating mechanism is not providing the actuating force, and the plunger is urged toward the open position when the actuating mechanism is providing the actuation force.

In embodiments, the mechanical seal assembly can have a "normally-open" configuration, in which the biasing mechanism is configured to urge the plunger axially outboard, such that the plunger is in the open position when the actuating mechanism is not providing the actuating force, and the plunger is urged toward the closed position when the actuating mechanism is providing the actuation force.

In embodiments, the biasing mechanism comprises one or more springs.

In embodiments, the inboard portion of the plunger comprises an annular axially inboard directed groove an annular elastomeric sealing element can be fixedly arranged within the groove.

In embodiments, the sealing fluid can be a conditioned process gas.

In embodiments, the mechanical seal assembly can include a second stationary ring and a second rotating ring.

Advantages of the disclosed embodiments include providing a dry gas seal with reduced emissions of sealing gas when a compressor is in standby, while not impacting compressor casing design, and fitting within existing compressor cavities.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The subject matter hereof may be more completely understood in consideration of the following detailed description of various embodiments in connection with the accompanying figures.

FIG. 3A is a plan view depicting a cross-section of a solenoid, according to an embodiment.

FIG. 3B is a plan view depicting a bobbin according to an embodiment.

FIG. 3C depicts section A-A of the bobbin of FIG. 3B, according to an embodiment.

FIG. 3D depicts Detail B of the bobbin of FIG. 3C, according to an embodiment.

FIG. 4 depicts a magnetic flux density diagram of the solenoid of FIG. 3, according to an embodiment.

FIG. 6A is a perspective view depicting a partial cross-section of a retainer, according to an embodiment.

FIG. 6B is a perspective view depicting a partial cross-section of a conventional retainer, according to an embodiment.

FIG. 7A depicts a partial cross-sectional view of a seal assembly with a normally-open shutdown valve, in a closed position, according to an embodiment.

FIG. 7B depicts a cross-sectional view of the seal assembly of FIG. 7A in an open position, according to an embodiment.

FIG. 8 is a perspective view depicting a partial cross section of a plunger, according to an embodiment.

FIG. 9 is a perspective view depicting a partial cross section of a plunger, according to an embodiment.

FIG. 10 is a perspective view depicting a partial cross section of a seal assembly with a normally-closed shutdown valve, in an open position according to an embodiment.

Figure 1:
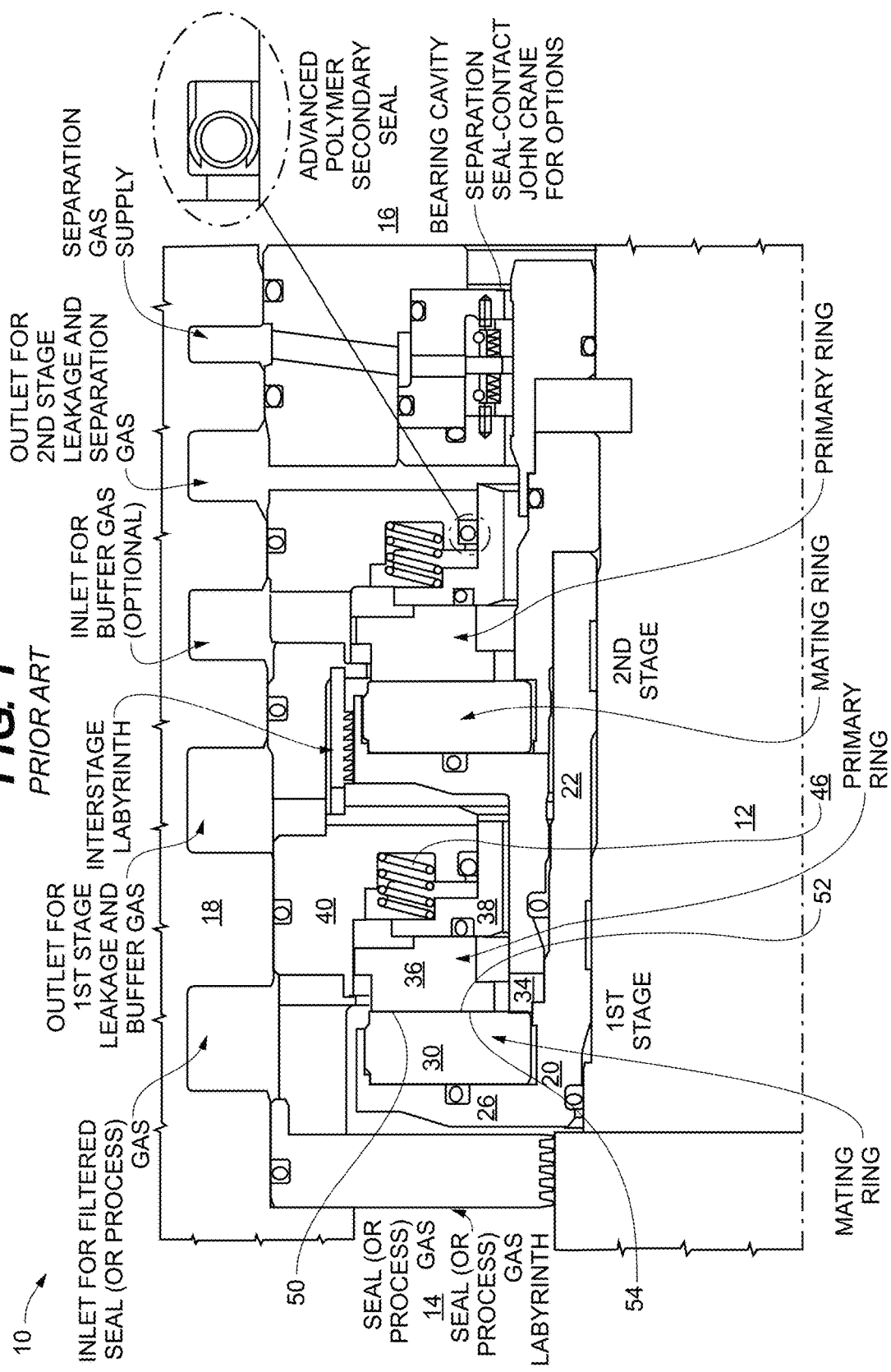
FIG. 1 is a plan view depicting a cross-section of a typical arrangement of a seal assembly.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 2B:
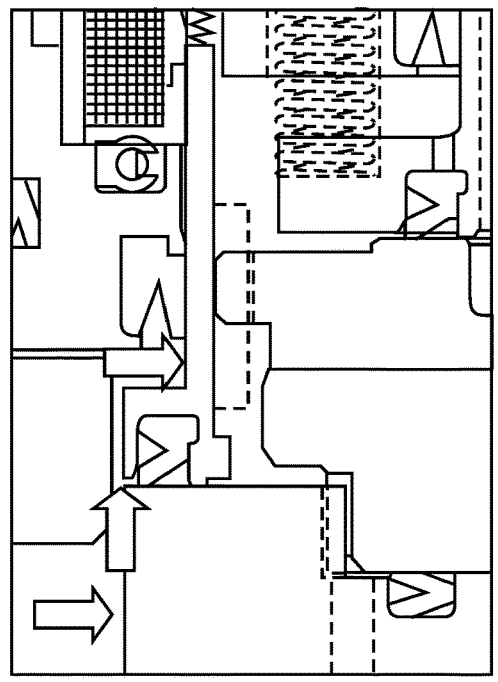
FIG. 2B is a plan view depicting a partial cross-section of the seal assembly of FIG. 2A in a closed position, according to an embodiment.
Figure 2A:
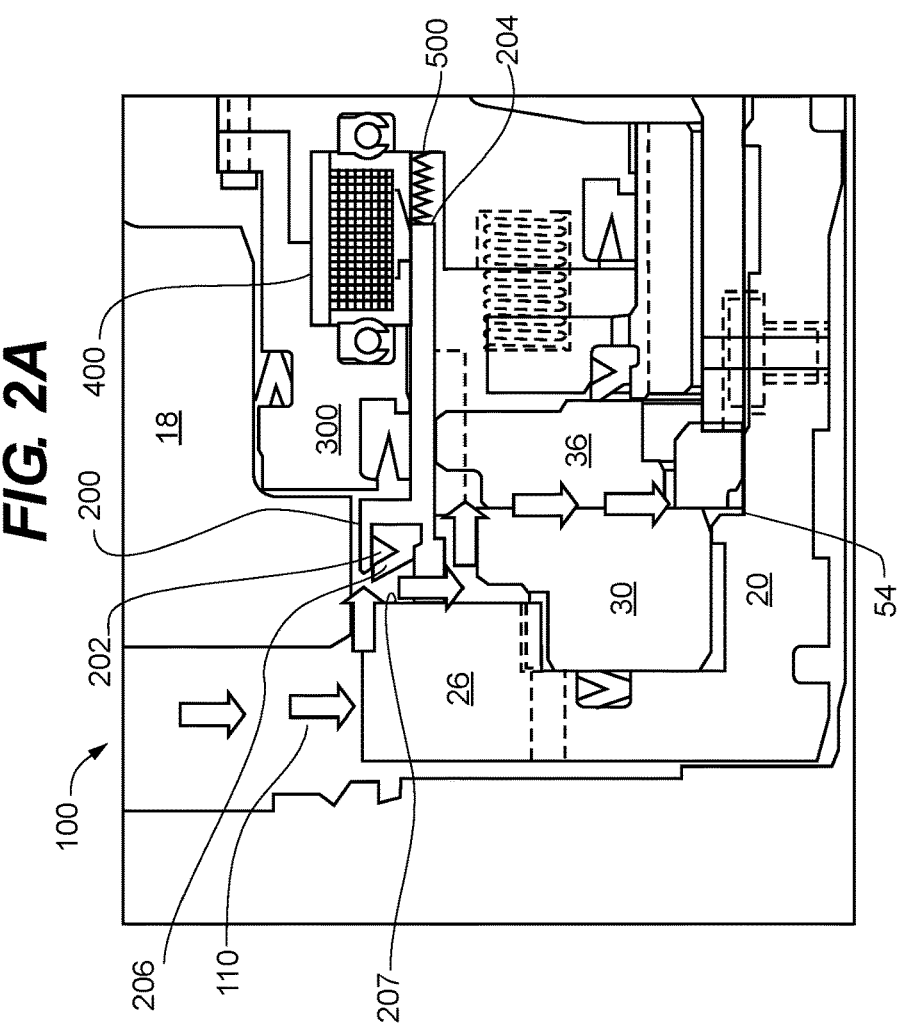
FIG. 2A is a plan view depicting a partial cross-section of a seal assembly with a normally-closed shutdown valve, in an open position according to an embodiment.

Embodiments of the present disclosure comprise seals assemblies comprising electronically controllable shutdown valves. FIGS. 2A and 2B respectively depict an open and closed position of a seal assembly 100 comprising a linearly actuated plunger 200 which can selectively inhibit the flow of seal gas 110 (depicted by arrows) to seal interface 54.

Plunger 200 extends axially outboard from an inboard groove 202, to outboard end 204. Inboard groove 202 can be configured to retain annular plunger sealing element 206, such that when plunger 200 is in the closed position depicted in FIG. 2B, plunger sealing element 206 is in sealing contact with a plunger seat comprising a portion of the outboard directed face of flange portion 26 of sleeve 20. Plunger sealing element 206 can be primarily v-shaped or u-shaped in cross-section, or can comprise a solid o-ring, or take any other configuration suitable for providing sealing engagement. Plunger sealing element 206 can comprise rubber, silicone, or other polymers, or other suitably resilient material.

Plunger 200 extends axially outboard from an inboard groove 202, to outboard end 204. Inboard groove 202 can be configured to retain annular plunger sealing element 206, such that when plunger 200 is in the closed position depicted in FIG. 2B, plunger sealing element 206 is in sealing contact with a plunger seat 207 comprising a portion of the outboard directed face of flange portion 26 of sleeve 20. Plunger sealing element 206 can be primarily v-shaped or u-shaped in cross-section, or can comprise a solid o-ring, or take any other configuration suitable for providing sealing engagement. Plunger sealing element 206 can comprise rubber, silicone, or other polymers, or other suitably resilient material.

Axial actuation of plunger 200 can be provided by annular solenoid 400. Solenoid 400 can comprise a coil, or other configuration suitable to convert electric current to a magnetic field capable of moving plunger 200 axially inboard or outboard. While annular solenoids comprising non-ferrormagnetic bobbins and casings can be used, solenoid 400 as depicted in FIG. 3A can provide a greater axial actuation force for a given cross-section area, decreasing the space requirements of seal assembly 100.

FIG. 3A depicts a cross-sectional view of an embodiment of a solenoid 400. Solenoid 400 comprises coil 402 comprising a plurality of windings of an electrically conductive and insulated wire, such as a copper-cored or aluminum-cored magnet wire. In an embodiment, coil 402 can comprise copper CA200 or an equivalent with a diameter (including insulation) of about 0.544 mm. In an embodiment, coil 402 can comprise about 140 turns. As assembled, coil 402 is arranged within an annular casing 404. Casing 404 can comprise a bobbin 406 and an outer portion 408. Unlike conventional solenoid bobbins and casings, casing 404 provides part of the magnetic circuit to produce actuation force.

Bobbin 406 can comprise a non-magnetic spacer 410 at a portion of a radially inward facing side. In embodiments, spacer 410 can present a cross sectional shape configured to force the magnetic material to saturate progressively when the current is increased and the plunger is moving. For example, spacer 410 can comprise a generally triangular portion 412 that is elongated in the intended direction of the actuation force. For example, the solenoid 400 depicted in FIG. 2A is arranged to provide an outboard directed actuation force to pull plunger 200 into an open position. The configuration of spacer 410 inhibits variation in the strength of the actuation force as the plunger position changes. FIG. 4 depicts the magnetic flux density across a cross section of solenoid 400 and a spring receiver 210 portion of a plunger 200 (spring receiver 210 is further depicted and described in FIGS. 7A-7B and the associated text below). FIGS. 3B-3D are plan, sectional, and detail views of bobbin 406, according to an embodiment.

Returning to FIG. 3A, in embodiments, bobbin 406 can be constructed in three pieces. Spacer 410 can comprise non-magnetic stainless steel or other nonmagnetic materials. Generally L-shaped side portions 414 and 416 are magnetic and can be configured to receive spacer 406 such that the radially inward face of casing 404 presents a portion of spacer 406. The components of bobbin 406 can be affixed via a method capable of withstanding expected forces within seal assembly 100 (for example, pressures up to about 300 bar), such as laser seam welding or other methods.

Coil 402 can be wound onto bobbin 406 via methods known in the art for winding of conventional solenoid coils. Outer portion 408 can comprise a magnetic material and can be affixed to side portions 414 and 416 to encase coil 402.

Solenoid 400 can comprise an electrical connection 420. In embodiments, electrical connection 420 can comprise electrical wires though wireless power transmission methods such as induction can be used in embodiments. In embodiments, electrical connection 420 can terminate at a controller (not shown) configured to energize solenoid 400 as needed to provide actuation force. In embodiments, controller can be in data communication with a rotational speed sensor or modulator.

Figure 5:
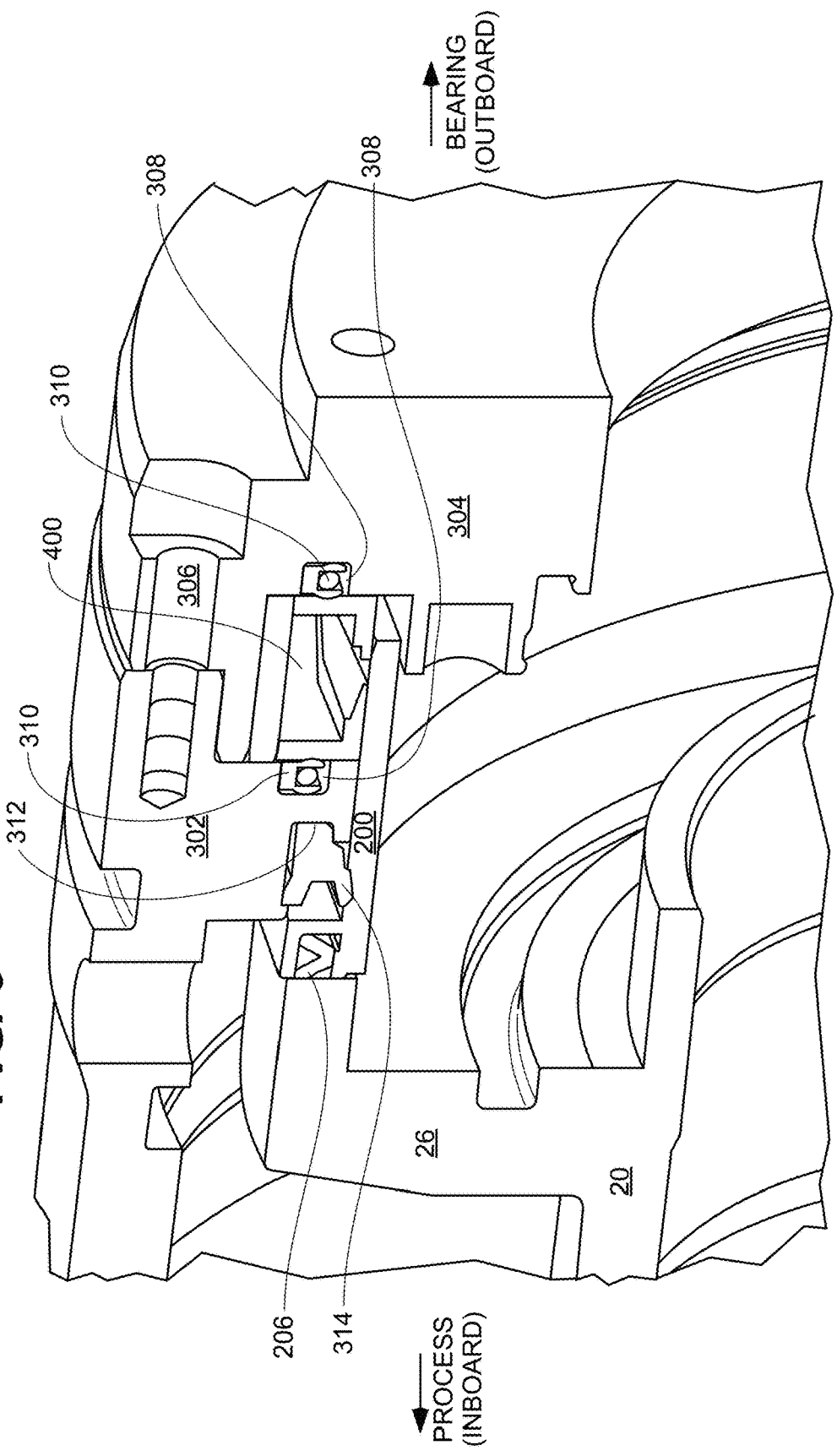
FIG. 5 is a perspective view depicting a partial cross-section of a seal assembly, according to an embodiment.

FIG. 5 is a perspective view of a cross section of a portion of seal assembly 100 depicting solenoid 400 and plunger 200 in the context of retainer 300 and sleeve 20. In contrast to conventional retainers 40 (as depicted in FIGS. 1 and 6B), retainer 300 can be constructed in multiple parts for ease of assembly in embodiments. Retainer 300 comprises annular inboard portion 302 and annular outboard portion 304. Each of inboard portion 302 and outboard portion 304 respectively defines a portion of a plurality of radially-spaced, axially-extending set screw bores 306, whereby set screws (or other fasteners) can be used to provide fixation between inboard portion 302 and outboard portion 304. Each of inboard portion 304 and outboard portion 302 further defines at least one annular solenoid seal grove 308 into which annular solenoid sealing elements 310 can be arranged.

Inboard portion 302 further comprises annular retainer seal groove 312 into which annular retainer sealing element 314 can be arranged between inboard portion 302 and plunger 200. Solenoid sealing elements 310 and retainer sealing element 314 can present cross-sections that are primarily v-shaped, u-shaped, or can comprise solid o-rings, or take any other configuration suitable for providing sealing engagement. Solenoid sealing elements 310 and retainer sealing element 314 can comprise rubber, silicone, or other polymers, or other suitably resilient material.

Solenoid 400 can be received within retainer 300. FIGS. 6A and 6B depict cross-sectional views of a conventional retainer 40 and a multipart retainer 300 according to embodiments of the present disclosure.

Seal assembly 100 can further comprise a plurality of radially-spaced plunger biasing members 500. The configuration arrangement of plunger 200, solenoid 400, and plunger biasing members 500 can provide normally-closed configurations, as depicted in FIGS. 2A and 2B, or normally-open configurations as depicted in FIGS. 7A and 7B. In normally-closed embodiments, plunger biasing members 500 can comprise compression springs having sufficient spring force to urge plunger 200 into sealing contact with plunger seat 207 when solenoid 400 is not providing actuation force. In an embodiment, twenty-four radially-spaced compression springs can be provided. In the normally-closed configuration, solenoid 400 is configured such that triangular portion of spacer 408 extends in an outboard axial direction. When solenoid 400 is activated, the generated magnetic force urges plunger 200 axially outboard. The normally-closed version therefore inhibits flow of sealing gas 110 to seal interface 52 unless the solenoid is energized. This configuration can inhibit leakage in the event of intentional or inadvertent loss of power to, or failure of solenoid 400.

In alternative applications, it may be desirable to employ a normally-open configuration in which the flow of sealing gas will not be interrupted in the event of loss of power to, or failure of solenoid 400. As depicted in FIGS. 7A and 7B, in a normally-open configuration, plunger biasing members 500 are arranged to urge plunger 200 outboard from plunger seat 207, and solenoid 400 is arranged to urge plunger 200 axially inboard to inhibit the flow of sealing gas 110 when energized. In normally-closed embodiments, plunger biasing members 500 can comprise extension springs having sufficient spring force to urge plunger 200 axially inboard. In alternate normally-closed embodiments, plunger biasing members 500 can comprise compression springs receivable within spring receiving bores or other features of an annular plunger spring receiver 210 and retainer 300.

FIGS. 8 and 9 depict a sectional perspective view of a plunger 200 and spring receiver 210 according to an embodiment. In embodiments, plunger 200 and spring receiver 210 can comprise a single unit. In other embodiments, spring receiver 210 can comprise a separate ring, which can be operably coupled to plunger 200 via a variety of methods known in the art. In one example, spring receiver 210 can comprise a ring with inner diameter slightly smaller than outer diameter of outboard portion 204 of plunger 200. Spring receiver 210 can be press fit around plunger 200 during assembly. In embodiments, outboard portion 204 of plunger 200 can present chamfer 214 for ease of assembly.

Figure 11:
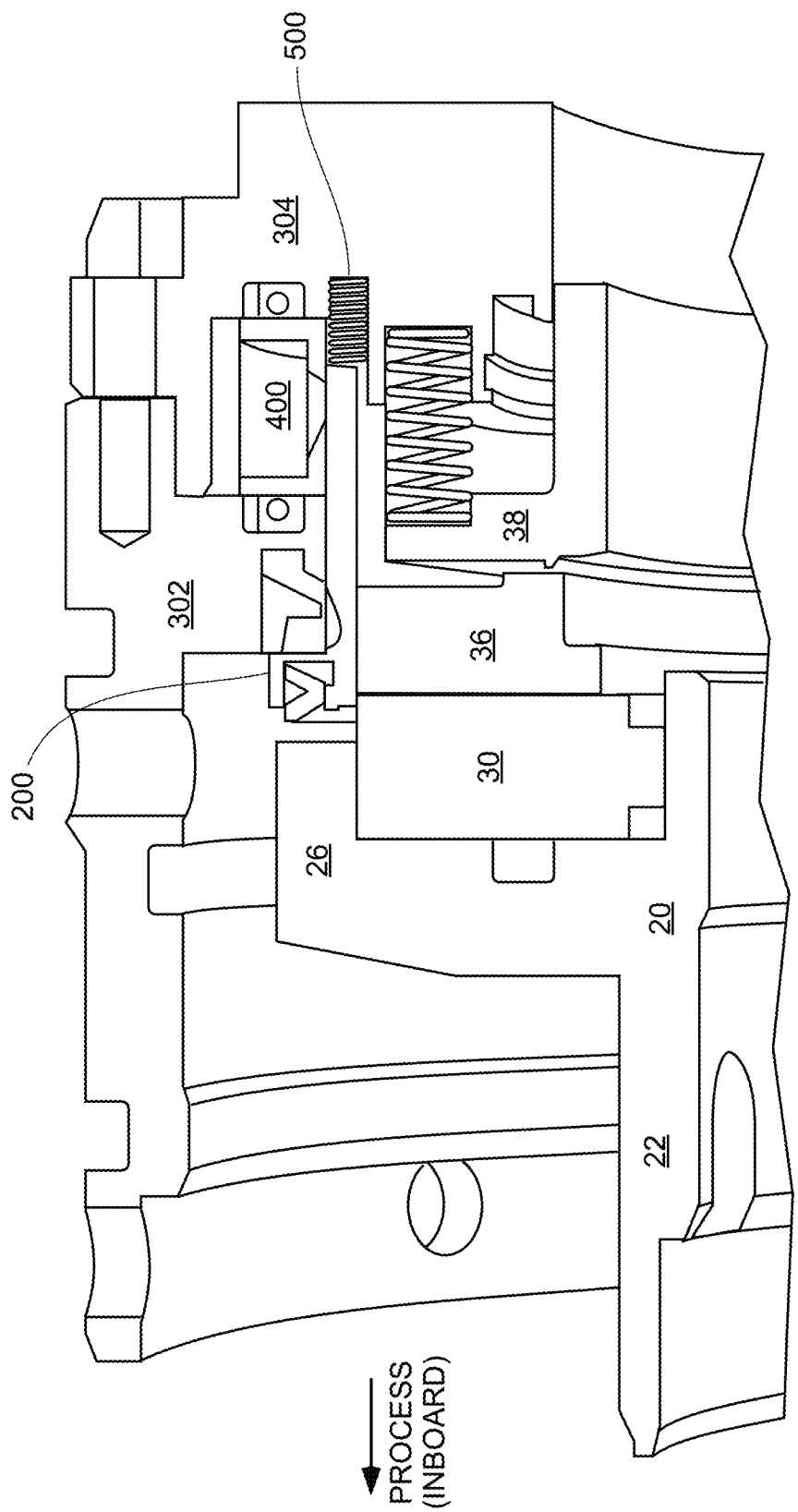
FIG. 11 is a perspective view depicting a partial cross section of the seal assembly of FIG. 10.

Embodiments of the present disclosure can be incorporated into a variety of seal designs beyond those depicted and described herein. For example, FIGS. 10 and 11 depict cross-sectional views of a single stage gas seal comprising a normally-closed configuration, as a contrast to that depicted in FIGS. 2A and 2B. In embodiments involving multiple seal stages (such as the tandem seal depicted in FIG. 1), multiple plunger elements may be provided. These multiple plungers can be driven from a single solenoid 400, or from multiple solenoids as required.

In operation, a controller can selectively energize solenoid 400 to cause plunger 200 to move between open and closed positions. In embodiments, the amount of energy delivered to solenoid 400 can vary as the plunger position changes in order to ramp the power level up or down. In other embodiments, the power level alternate between fixed minimum and maximum values (ON or OFF).

Figure 12:
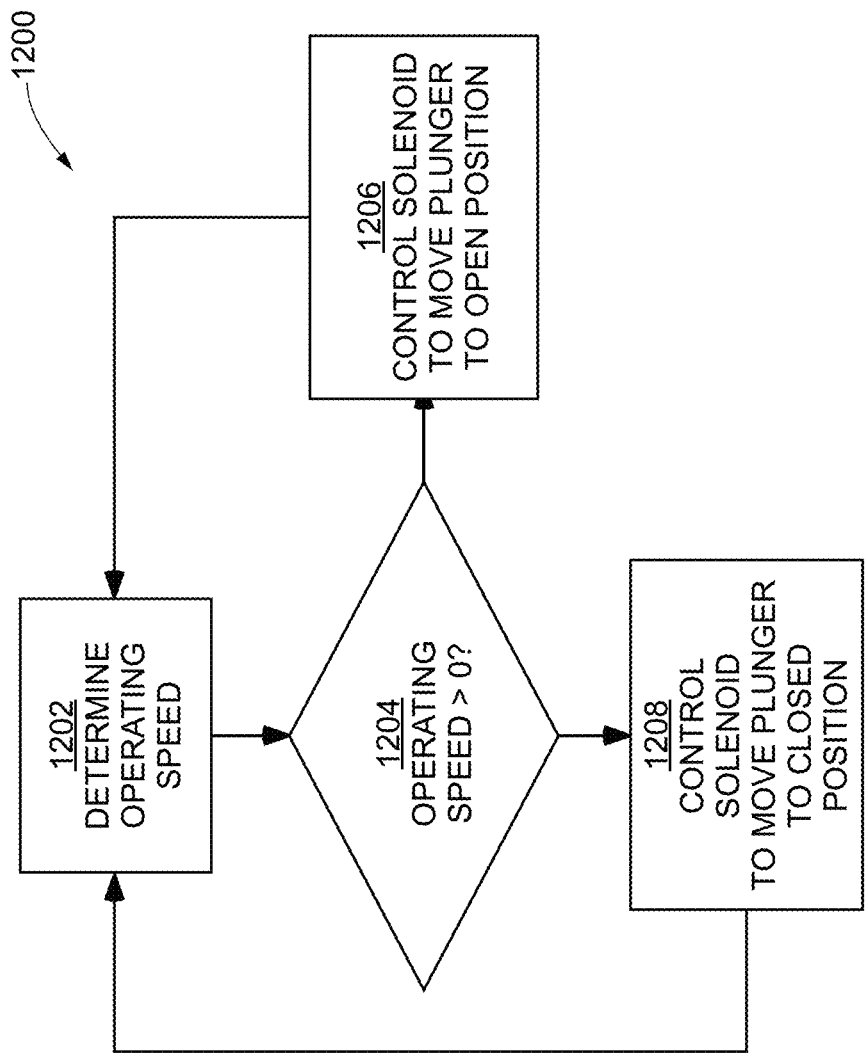
FIG. 12 is a flowchart depicting a method for controlling a shutdown valve, according to an embodiment.

In embodiments, control can be based on the actual rotation speed of shaft 12. FIG. 12 is a flowchart depicting a method 1200 for operation of solenoid 400, according to an embodiment. At 1202, the operating speed of the shaft 12 can be determined. At 1204, if the operating speed is greater than zero, the solenoid can be controlled to move the plunger 200 into an open position at 1206. Control can then return to 1202. If the shaft 12 is stationary, solenoid 400 can be controlled by moving the plunger into a closed position at 1208. Control can then return to 1202. If more, fewer, or alternate sensor data streams are provided, alternate sensor data analysis and solenoid control tasks may be performed by embodiments.

In operation, the rotation of shaft 12 relative to energized solenoid 400 can generate unwanted induction currents in solenoid 400, or cause shaft 12 to become magnetized itself. In addition, magnetic portions of plunger 200 and spring receiver 210 (if present) can become magnetically coupled to retainer 300, sleeve 20, or other magnetic components of seal assembly 100. Embodiments therefore can advantageously comprise retainer 300, sleeve 20, and carrier 38 comprised of non-magnetic material such as non-magnetic stainless steel. In embodiments, those portions of plunger 200 not in contact with solenoid 400 can also comprise non-magnetic material. For example, where a magnetic spring receiver 210 is present, other portions of plunger 200 may not comprise a magnetic material.

Those of ordinary skill in the art will appreciate that the embodiments of the present disclosure provide a number of improvements over conventional devices. In one aspect, embodiments of seal assembly 100 can be retrofit into existing compressors or other rotating machines without the need to expand the seal chamber, or provide additional gas access ports or processing equipment.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mechanical seal assembly for coaxial arrangement around a rotatable shaft of a machine to inhibit the emission of a pressurized gas from within the machine, the mechanical seal assembly comprising:
    a mechanical seal including a rotating ring presenting a first annular seal face and a stationary ring presenting a second annular seal face oriented in opposed juxtaposition to the first annular seal face, the first and second annular seal faces being axially shiftable relative to each other at least in part by a flow of sealing fluid passing between the first and second annular seal faces;
    an annular plunger at least partially surrounding the mechanical seal and being axially slidable between—
        an open position wherein an inboard end of the plunger is axially spaced apart from a plunger seat, thereby permitting the flow of sealing fluid to the mechanical seal through a passageway defined between the inboard end of the plunger and the plunger seat, and
        a closed position wherein the inboard end of the plunger abuts the plunger seat, such that the flow of the sealing fluid through the passageway to the mechanical seal is inhibited.

2. The mechanical seal assembly of claim 1, further comprising:
    a plunger biasing mechanism, configured to provide a biasing force to urge the plunger axially; and
    an actuating mechanism configured to selectively provide an actuation force in opposition to the biasing mechanism to urge the plunger in a direction opposite the biasing force.

3. The mechanical seal assembly of claim 2, wherein the actuating mechanism comprises an annular solenoid, and at least a portion of the plunger comprises a ferromagnetic material, such that the actuating force comprises a magnetic force produced by the solenoid.

4. The mechanical seal system of claim 3, wherein the solenoid comprises an annular coil and a casing, the casing comprising:
    a ferromagnetic radially outward wall,
    a ferromagnetic axially inboard wall,
    a ferromagnetic axially outboard wall,
    and a partially ferromagnetic radially inward wall comprising a non-magnetic spacer.

5. The mechanical seal assembly of claim 3, further comprising a controller in electrical communication with the solenoid and a rotational speed sensor, the controller configured to energize the solenoid based on the rotational speed of the shaft.

6. The mechanical seal assembly of claim 3, further comprising an annular retainer arranged radially outward of the mechanical seal and the plunger; wherein the retainer defines an annular solenoid groove and the solenoid is arranged within the solenoid groove of the retainer.

7. The mechanical seal assembly of claim 6, wherein the retainer comprises a non-magnetic material.

8. The mechanical seal assembly of claim 2, wherein the biasing mechanism is configured to urge the plunger axially inboard, such that the plunger is in the closed position when the actuating mechanism is not providing the actuating force, and the plunger is urged toward the open position when the actuating mechanism is providing the actuation force.

9. The mechanical seal assembly of claim 2, wherein the biasing mechanism is configured to urge the plunger axially outboard, such that the plunger is in the open position when the actuating mechanism is not providing the actuating force, and the plunger is urged toward the closed position when the actuating mechanism is providing the actuation force.

10. The mechanical seal assembly of claim 2, wherein the biasing mechanism comprises one or more springs.

11. The mechanical seal assembly of claim 1, wherein the inboard portion of the plunger comprises an annular axially inboard directed groove; and
    further comprising an annular elastomeric sealing element fixedly arranged within the groove.

12. The mechanical seal assembly of claim 1, wherein the sealing fluid is a conditioned process gas.

13. The mechanical seal assembly of claim 1, further comprising a second stationary ring and a second rotating ring.

14. A mechanical seal assembly for coaxial arrangement around a rotatable shaft of a machine to inhibit the emission of a pressurized gas from within the machine, the mechanical seal assembly comprising:
    a mechanical seal including a rotating ring presenting a first annular seal face and a stationary ring presenting a second annular seal face oriented in opposed juxtaposition to the first annular seal face, the first and second annular seal faces being axially shiftable relative to each other at least in part by a flow of sealing fluid passing between the first and second annular seal faces;
    an annular plunger at least partially surrounding the mechanical seal and being axially slidable between—
        an open position wherein an inboard end of the plunger is axially spaced apart from a plunger seat, thereby permitting the flow of sealing fluid to the mechanical seal through a passageway defined between the inboard end of the plunger and the plunger seat, and a closed position wherein the inboard end of the plunger abuts the plunger seat, such that the flow of the sealing fluid through the passageway to the mechanical seal is inhibited;

a plunger biasing mechanism, configured to provide a biasing force to urge the plunger into the closed position; and an actuating mechanism configured to selectively provide an actuation force in opposition to the biasing mechanism and urge the plunger into the open position.

15. The mechanical seal assembly of claim 14, wherein the actuating mechanism comprises an annular solenoid, and at least the outboard portion of the plunger comprises a ferromagnetic material, such that the actuating force comprises a magnetic force produced by the solenoid.

16. A mechanical seal assembly for coaxial arrangement around a rotatable shaft of a machine to inhibit the emission of a pressurized gas from within the machine, the mechanical seal assembly comprising:

a mechanical seal including a rotating ring presenting a first annular seal face and a stationary ring presenting a second annular seal face oriented in opposed juxtaposition to the first annular seal face, the first and second annular seal faces being axially shiftable relative to each other at least in part by a flow of sealing fluid passing between the first and second annular seal faces;

an annular plunger at least partially surrounding the mechanical seal and being axially slidable between— an open position wherein an inboard end of the plunger is axially spaced apart from a plunger seat, thereby permitting the flow of sealing fluid to the mechanical seal through a passageway defined between the inboard end of the plunger and the plunger seat, and a closed position wherein the inboard end of the plunger abuts the plunger seat, such that the flow of the sealing fluid through the passageway to the mechanical seal is inhibited;

a plunger biasing mechanism, configured to provide a biasing force to urge the plunger into the open position; and an actuating mechanism configured to selectively provide an actuation force in opposition to the biasing mechanism and urge the plunger into the closed position.

17. The mechanical seal assembly of claim 16, wherein the actuating mechanism comprises an annular solenoid, and wherein at least the outboard portion of the plunger comprises a ferromagnetic material, such that the actuating force comprises a magnetic force produced by the solenoid.

18. A mechanical seal assembly for coaxial arrangement around a rotatable shaft of a machine to inhibit the emission of a pressurized gas from within the machine, the mechanical seal assembly comprising:

a mechanical seal including a rotating ring presenting a first annular seal face and a stationary ring presenting a second annular seal face oriented in opposed juxtaposition to the first annular seal face, the first and second annular seal faces being axially shiftable relative to each other at least in part by a flow of sealing fluid passing between the first and second annular seal faces;

an annular plunger, at least partially comprising a ferromagnetic material, and at least partially surrounding the mechanical seal and being axially slidable between— an open position wherein an inboard end of the plunger is axially spaced apart from a plunger seat, thereby permitting the flow of sealing fluid to the mechanical seal through a passageway defined between the inboard end of the plunger and the plunger seat, and a closed position wherein the inboard end of the plunger abuts the plunger seat, such that the flow of the sealing fluid through the passageway to the mechanical seal is inhibited, a plunger biasing mechanism, configured to provide a biasing force to urge the plunger axially; and an annular solenoid an annular coil and a casing, the casing comprising a ferromagnetic radially outward wall, a ferromagnetic axially inboard wall, a ferromagnetic axially outboard wall, and a partially ferromagnetic radially inward wall comprising a non-magnetic spacer, such that the annular solenoid is configured to selectively provide a magnetic actuation force in opposition to the biasing mechanism to urge the plunger in a direction opposite the biasing force.

* * * * *